(12) United States Patent
Yamaguchi et al.

(10) Patent No.: US 6,667,757 B2
(45) Date of Patent: Dec. 23, 2003

(54) LIGHT SCANNING UNIT USE IN IMAGE FORMING APPARATUS

(75) Inventors: Masao Yamaguchi, Funabashi (JP); Takashi Shiraishi, Kawasaki (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 76 days.

(21) Appl. No.: 10/131,207

(22) Filed: Apr. 25, 2002

(65) Prior Publication Data

US 2003/0020801 A1 Jan. 30, 2003

(30) Foreign Application Priority Data

Apr. 27, 2001 (JP) .......................... 2001-133335

(51) Int. Cl.[7] .......................... G02B 3/02; G02B 26/08; B41J 2/47

(52) U.S. Cl. .................. 347/259; 347/243; 347/244; 347/258

(58) Field of Search .................. 359/642, 708, 359/728, 718, 719, 720, 727, 205, 206, 215; 347/241, 244, 243, 256, 258, 259, 261

(56) References Cited

U.S. PATENT DOCUMENTS 5,774,249 A * 6/1998 Shiraishi et al. ............. 359/205
6,288,819 B1 * 9/2001 Aoki et al. ................. 359/205

* cited by examiner

Primary Examiner—Huan Tran
(74) Attorney, Agent, or Firm—Foley & Lardner

(57) ABSTRACT

In a light scanning unit in accordance with the invention, an image forming optical system has an image forming lens having at least one surface which is asymmetrical in a first direction on a boundary point constituted by a position at which a light flux passes through an optical axis between respective reflective surfaces of a polygon mirror and a photosensitive drum.

20 Claims, 7 Drawing Sheets

LIGHT SCANNING UNIT USE IN IMAGE FORMING APPARATUS

CROSS-REFERENCE TO RELATED APPLICATIONS

This application is based upon and claims the benefit of priority from the prior Japanese Patent Application No. 2001-133335, filed Apr. 27, 2001, the entire contents of which are incorporated herein by reference.

BACKGROUND OF THE INVENTION

1. Field of the Invention

The present invention relates to a light scanning unit used in a laser printer, a digital copying machine and the like, and more particularly, to a light scanning unit of an over illumination type in which a width of luminous flux incident to a polygon mirror in a main scanning direction (a direction along a direction of rotation of the polygon mirror) is wider than a width of a surface of a reflection surface in the polygon mirror in the main scanning direction.

2. Description of the Related Art

In the laser printer, the digital copying machine and the like corresponding to an image forming apparatus of an electrostatic process copying method in which an electrostatic latent image is formed by using an optical beam and a visible (developer) image is obtained by developing the electrostatic latent image, there can be employed an optical scanning unit which decomposes an image to be output (an original image) into a first direction and a second direction perpendicular to the first direction, and repeatedly outputs, that is, scans an optical beam having a light intensity changed on the basis of an image data in any one of the decomposed first direction and second direction in a substantially linear manner at a predetermined time interval. In this case, an image corresponding to the original image can be obtained by moving a recording medium and a latent image holding body at a predetermined speed in a direction perpendicular to the scanned light beam during a time when the light beam corresponding to one line and the light beam corresponding to the next one line are scanned or during a time when one line is scanned.

In the light scanning unit mentioned above, the direction in which the light beam is scanned, that is, the first direction is generally called as a main scanning direction. Further, the second direction perpendicular to the first direction is generally called as a sub-scanning direction.

The light scanning unit includes a semiconductor laser device corresponding to a light source for emitting the light beam (the laser beam), a first lens group for adjusting cross sectional beam diameters and cross sectional shaped of the light beams emitted from the semiconductor laser device to a predetermined magnitude and shape, a deflecting unit for continuously reflecting the light beams adjusted to the predetermined magnitude and shape by the first lens group in a direction perpendicular to a direction in which the recording medium or the latent image holding body is moved, thereby deflecting (scanning) the light beams, a second lens group for forming an image of the light beam deflected by the deflecting unit at a predetermined position of the recording medium or the latent image holding body, and the like.

The image forming apparatus shifts the recording medium or the latent image holding member for holding the image (latent image) at only one line every time when the image data corresponding to one line is irradiated by the light scanning unit so as to form the aligned image in sequence in the direction in which the image corresponding to one line is orthogonal to the image corresponding to one line. In this case, the image forming apparatus can be classified into a wet type (a liquid type) and a dry type, and a direct type and a copy type (an indirect type) in correspondence to a method of making the latent image visible and whether or not the latent image is directly formed on the recording medium.

In the image forming apparatus and the light scanning unit as mentioned above, a relation expressed by the following formula (1) is established between a process speed (a speed at which the recording medium or the latent holding body is moved), an image resolution (a number of dots per unit length, generally a number of dots per 1 inch), a rotational speed (a rotational number) of a polygon mirror motor of a deflecting unit and a number of surfaces of the polygon mirror of the deflecting unit, when the process speed is set to P (mm/s), the image resolution (the number of the dots per 1 inch) is set to R (dpi), the rotational number of the polygon mirror motor is set to Vr (rpm) and the number of the surfaces of the polygon mirror is set to N.

$$P \times R = 25.4 \times Vr \times N/60 \qquad (1)$$

On the basis of the formula (1), it is deemed that the image forming speed and the image resolution are in proportion to the rotational number of the polygon mirror (being generally the same as the rotational number of the polygon mirror motor) and the number of the surfaces of the polygon mirror. Accordingly, in order to make the speed of the image forming apparatus high (increase the image forming speed per the unit time) and make the resolution high (improve the image resolution), it is necessary to increase the number of the surfaces of the polygon mirror or increase the rotational number of the polygon mirror.

In these days, in the light scanning unit of an under illumination type (a generic term at a time of comparing with an over illumination type) utilized in a lot of image forming apparatuses, the width in the main scanning direction of the light beam (the light flux) incident to the polygon mirror (corresponding to the cross sectional beam diameter, and the beam diameter in the main scanning direction in the case that the main scanning direction is different from the sub scanning direction) is limited to be small in comparison with the width in the main scanning direction of an optional reflective surface of the polygon mirror. Accordingly, the light beam guided to each of the reflective surfaces of the polygon mirror is all reflected by the reflective surface.

On the contrary, the cross sectional beam diameter of the light beam guided to the recording medium or the latent image holding body (the image surface) (the beam diameter in the main scanning direction in the case that the main scanning direction is different from the sub scanning direction) is in proportion to an F number Fn of the second lens group (an image forming optical system). The F number Fn is expressed by the formula Fn=f/D in the case that a focal distance of the image forming optical system is set to f, and the diameter in the main scanning direction of the light beam on the optional reflective surface in the polygon mirror is set to D. Accordingly, in order to increase the resolution, when it is intended to reduce the cross sectional beam diameter of the light beam on the subject to be scanned (the image surface), that is, the recording medium or the latent image holding body (a photo conductor), it is necessary to increase the cross sectional beam diameter in the main scanning direction on each of the reflective surfaces of the polygon mirror. Accordingly, when increasing the surface width of each of the reflective surfaces of the polygon mirror and further increasing the surface number of the reflective surfaces, the size of the polygon mirror is made large.

However, in order to rotate the polygon mirror having a large size at a high speed, a large-size motor having a large torque is required. In this case, of course, the motor cost is increased. At the same time, since a sound and a vibration are increased, and a lot of heat is generated, it is necessary to device a countermeasure against them.

As the countermeasure, there is a light scanning unit of an over illumination type. A principle of the light scanning unit using the over illumination is disclosed, for example, in Laser Scanning Notebook (attributed to Leo Beiser, SPIE OPTICAL ENGINEERING PRESS) and the like.

In the light scanning unit of the over illumination type, since the width of the main scanning direction of the optical beam irradiated onto each of the reflective surfaces of the polygon mirror is set to be larger than the width in the main scanning direction of the individual reflective surface of the polygon mirror, it is possible to reflect the light beam on whole surface of each of the reflective surfaces. Accordingly, it is possible to increase the number of the reflective surfaces of the polygon mirror in order to increase the image forming speed and the resolution without increasing the size of the polygon mirror, particularly, the diameter thereof more than necessary.

As mentioned above, a magnitude of a load applied to the polygon motor can be reduced by applying the over illumination to the relation between the cross sectional beam diameter of the light beam irradiated onto the polygon mirror and the width in the main scanning direction of each of the reflective surfaces in the polygon mirror.

Further, even when rotating the polygon mirror at a high speed, a heat generation can be restricted.

Accordingly, a cost of the polygon motor can be reduced. Further, since the surface number of the reflective surfaces of the polygon mirror is increased, whereby a shape of the main scanning surface of the polygon mirror gets close to a complete round, it is possible to reduce the sound, particularly a wind noise and a vibration. In this case, since the sound and the vibration are reduced to a certain level, thereby reducing the number of the parts such as a dust-proof glass and the like which are required for preventing the sound and keep an airtight, it is expected to obtain an advantage that the cost can be further reduced. Further, it is possible to increase a duty cycle.

In the light scanning unit of the over illumination type mentioned above, there is a problem that the width of the light beam deflected by the polygon mirror in the main scanning direction changes in correspondence to a scanning angle although in the light scanning unit of the under illumination type, the width of the light beam deflected by the polygon mirror in the main scanning direction is fixed without relation to the scanning angle (a positional angle).

As mentioned above, in the light scanning unit of the over illumination type, since the F number Fn changes in correspondence to the change of the angle at which the light beam guided to the optional reflective surface of the polygon mirror is reflected on the optional reflective surface of the polygon mirror, that is, the scanning angle, a dispersion (a deviation) is generated in the main scanning direction of the cross sectional beam diameter of the light beam reaching the photo conductor (the image surface). In particular, in the case that the light beam incident to the polygon mirror has an angle with respect to an optical axis of the image forming optical system on the main scanning plane (the light beam is incident from an oblique direction), there is a problem that the dispersion of the cross sectional beam diameters is left-right asymmetrical to the center of the optical axis of the image forming optical system, in connection with the main scanning direction.

In this case, when the light beam is incident from the front surface (near) the main scanning direction onto the optional reflective surface of the polygon mirror in order to reduce the dispersion of the cross sectional beam diameter of the optical beam on the image surface (the photo conductor), there is a case that the light beam reflected (deflected) on the individual reflective surface of the polygon mirror is reflected by the second lens group so as to be returned to the optional reflective surface of the polygon mirror, and then is again reflected toward the second lens group. When the light beam oscillating between the second lens group and the optional reflective surface of the polygon mirror forms the image within the image area of the photo conductor, there is a problem that an image quality of the image is deteriorated.

Further, it is possible to prevent the light beam oscillating between the second lens group and each of the reflective surfaces of the polygon mirror from being generated, by providing with a reflection preventing film (a coating for improving a light transmittance) on the lens surface of the lens included in the second lens group.

However, of course, there is a problem that a cost of a lens simple substance is increased. In this case, in the case that the reflection preventing film is provided on the lens surface of the lens having a low glass transition temperature, there is a risk that a profile irregularity of the lens surface is reduced and an optical performance is deteriorated.

BRIEF SUMMARY OF THE INVENTION

An object of the present invention is to provide a light scanning unit of an over illumination type which can prevent a deterioration of an image quality caused by a light beam reflected on a lens surface of an image forming lens for forming an image of a light beam on a photo conductor being again scanned to the photo conductor through an image forming lens, and can reduce a size of the unit.

The invention is made for the purpose of achieving the object mentioned above, and provided a light scanning unit comprising: a pre-deflection optical system aligning a light flux from a light source so as to form a long linear image in a first direction; a light scanning means scanning the light flux to a predetermined position of a subject to be scanned; and an image forming optical system forming an image of the light flux scanned by the light scanning means on the subject to be scanned, the light flux incident to the light scanning means being wider than a width in the first direction of a single reflective surface of the light scanning means, wherein the image forming optical system includes an optical part having at least one surface which is asymmetrical in the first direction with respect to a center of the optical axis.

Further, the invention provides a light scanning unit comprising: a pre-deflection optical system aligning a light flux from a light source so as to form a long linear image in a first direction; a light scanning means scanning the light flux to a predetermined position of a subject to be scanned; and an image forming optical system forming an image of the light flux scanned by the light scanning means on the subject to be scanned, the light flux incident to the light scanning means being wider than a width in the first direction of a single reflective surface of the light scanning means, wherein the image forming optical system has at least one surface in which its own center is rotated at a predetermined amount with respect to a center of rotation of a surface rotated around an axis in a second direction perpendicular to the first direction, at a position where a longitudinal center is made eccentric or crosses to the optical axis, in the first direction with respect to the optical axis.

Still further, the invention provides a light scanning unit comprising: a pre-deflection optical system aligning a light flux from a light source so as to form a long linear image in a first direction; a light scanning means scanning the light flux to a predetermined position of a subject to be scanned; and an image forming optical system forming an image of the light flux scanned by the light scanning means on the subject to be scanned, the light flux incident to the light scanning means being wider than a width in the first direction of a single reflective surface of the light scanning means, wherein the image forming optical system includes optical parts having at least one surface with a power, and an aspherical surface term of a shape of at least one the surface with the power among the optical parts includes a term $Am \neq 0$ or $Amn \neq 0$ in the formula $Am\Sigma ym$ ($m=0, 1, 2, 3, \ldots$) or $Amn\Sigma ymzn$ ($m=0, 1, 2, 3, \ldots, n=0, 1, 2, 3, \ldots$) when the formula $m=2 \times k+1$ ($k=0, 1, 2, 3, \ldots$) is established, in the case of setting the first direction of the at least one surface with the power to a y axis, a second direction perpendicular to the first direction to a z axis and a direction in which the light flux moves forward to an x axis.

Furthermore, the invention provides a light scanning unit comprising: a pre-deflection optical system aligning a light flux from a light source so as to form a long linear image in a first direction; a light scanning means scanning the light flux to a predetermined position of a subject to be scanned; and an image forming optical system forming an image of the light flux scanned by the light scanning means on the subject to be scanned, the light flux incident to the light scanning means being wider than a width in the first direction of a single reflective surface of the light scanning means, wherein the image forming optical system includes a lens having a power, the lens having the power has at least one surface accompanying with not surface treatment for restricting a reflection at a time when the light flux is incident, and an incident light to the light scanning means and an optical axis of the image forming optical system have an angle on the main scanning plane or the sub scanning plane.

Moreover, the invention provides a light scanning unit comprising: a pre-deflection optical system aligning a light flux from a light source so as to form a long linear image in a first direction; a light scanning means scanning the light flux to a predetermined position of a subject to be scanned; and an image forming optical system forming an image of the light flux scanned by the light scanning means on the subject to be scanned, the light flux incident to the light scanning means being wider than a width in the first direction of a single reflective surface of the light scanning means, wherein the image forming optical system includes a plurality of optical parts, and a number of the optical parts having a power is equal to or less than 2.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiment of the invention, and together with the general description given above and the detailed description of the embodiment given below, serve to explain the principles of the invention.

DETAILED DESCRIPTION OF THE INVENTION

A description will be in detail given below of embodiments in accordance with the present invention with reference to the accompanying drawings.

Figure 1:
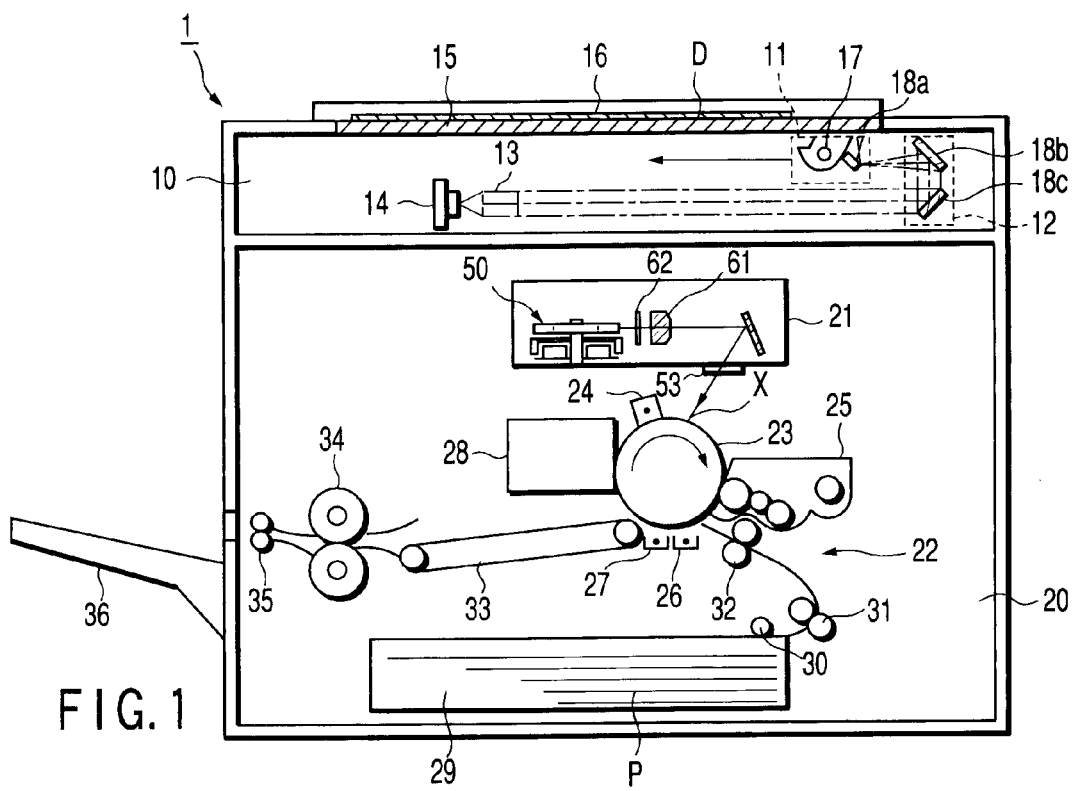
FIG. 1 is a schematic view showing an example of an image forming apparatus in which a light scanning unit corresponding to an embodiment in accordance with the present invention is assembled.

FIG. 1 shows a digital copying machine corresponding to an image forming apparatus having a light scanning unit corresponding to an embodiment in accordance with the present invention.

As shown in FIG. 1, a digital copying unit 1, for example, has a scanner portion 10 corresponding to an image reading means, and a printer portion 20 corresponding to an image forming means.

The scanner portion 10 has a first carriage 11 formed so as to be capable of moving in a direction of an arrow, a second carriage 12 moved so as to be driven by the first carriage 11, an optical lens 13 applying a predetermined image forming characteristic to a light beam emitted from the second carriage 12, a photoelectric conversion element 14 for converting the light beam applied the predetermined image forming characteristic by the optical lens 13 in a photo-electric manner so as to output an electric signal, a document table 15 for holding a document D, a document holding cover 16 for pressing the document D to the document table 15, and the like.

The first carriage 11 is provided with a light source 17 for lighting up the document D, and a mirror 18a for reflecting the reflected light lighted up by the light irradiated from the light source 17 and reflected from the document D toward the second carriage 12.

The second carriage 12 has a mirror 18b for bending the light transmitted from the mirror 18a in the first carriage 11 at 90 degrees, a mirror 18c for bending the light bend by the mirror 18b further at 90 degrees.

The document D mounted on the document table 15 is lighted up by the light source 17 so as to reflect a reflected light in which a light contrast corresponding to with or without an image distributes. The reflected light of the document D is incident to the optical lens 13 via the mirrors 18a, 18b and 18c as an image information of the document D.

The reflected light from the document D guided to the optical lens 13 is focused onto a light receiving surface of the photoelectric conversion element (a CCD sensor) 14 by the optical lens 13.

Further, when starting an image formation is input from an operation panel or an external apparatus (not shown), the first carriage 11 and the second carriage 12 are temporarily moved to a home position defined so as to have a predetermined positional relation with the document table 15 due to a driving operation of a carriage driving motor (not shown), and thereafter is moved along the document table 15 at a predetermined speed, whereby an image information of the document D, that is, an image light reflected from the document D is cut out at a predetermined width along a direction in which the mirror 18a is extended out, that is, the main scanning direction so as to be reflected toward the mirror 18b, and is sequentially taken out on the basis of a unit corresponding to the width cut out by the mirror 18a with respect to a direction perpendicular to the direction in which the mirror 18a is extended out, that is, the sub scanning direction, so that all the image information of the document D is guided to the CCD sensor 14. In this case, the electric signal output from the CCD sensor 14 is an analogue signal, is converted into a digital signal by an A/D converter (not shown), and is temporarily stored as an image information in an image memory (not shown).

In the manner mentioned above, the image of the document D mounted on the document table 15 is converted into the digital image signal, for example, of 8 bits showing a contrast of the image in an image processing portion (not shown) at every one line along a first direction in which the mirror 18a is extended out, by the CCD sensor 14.

The printer portion 20 has an image forming portion 22 of an electrophotographic type which can form an image on a light scanning unit 21 corresponding to an exposure unit described in a later stage by using FIGS. 2A, 2B and 3 and a recording paper P corresponding to a medium on which the image is formed.

The image forming portion 22 is rotated so that an outer peripheral surface moves at a predetermined speed by a main motor described by using FIG. 3, and has a drum-shaped photo conductor (hereinafter, refer to a photosensitive drum) 23 on which the image data, that is, an electrostatic latent image corresponding to the image of the document D is formed by a laser beam L irradiated from the light scanning unit 21, an electrostatic charging unit 24 applying a surface potential having a predetermined polarity to a surface of the photosensitive drum 23, a developing unit 25 selectively supplying a toner corresponding to a visualization material to the electrostatic latent forming the image on the photosensitive drum 23 by the light scanning unit so as to develop, a transfer unit 26 applying a predetermined electric field to a toner forming the image on an outer periphery of the photosensitive drum 23 by the developing unit 25 so as to transfer on the recording paper P, a separating unit 27 releasing the recording paper P on which the toner image is transferred by the transfer unit and the toner between the recording paper P and the photosensitive drum 23 from an electrostatic adsorption with respect to the photosensitive drum 23 so as to separate (from the photosensitive drum 23), a cleaning unit 28 removing a transfer residual toner left on the outer peripheral surface of the photosensitive drum 23 and returning an electric potential distribution of the photosensitive drum 23 to a state before the surface potential is supplied by the electrostatic charging unit 24, and the like. In this case, the electrostatic charging unit 24, the developing unit 25, the transfer unit 26, the separating unit 27 and the cleaning unit 28 are sequentially arranged along a direction of an arrow in which the photosensitive drum 23 is rotated. Further, the laser beam L from the light scanning unit 21 is irradiated to a predetermined position X on the photosensitive drum 23 disposed between the electrostatic charging unit 24 and the developing unit 25.

The image signal read from the document D in the scanner portion 10 is converted into a printing signal in accordance with a process, for example, a gradation process or the like for correcting a profile or displaying a half tone, in an image processing portion (not shown), and is further converted into a laser modulating signal for changing a light intensity of the laser beam irradiated from a semiconductor laser device described below in the light scanning unit 21 to any one of an intensity by which the electrostatic latent image can be recorded on the outer periphery of the photosensitive drum 23 to which the predetermined surface potential is applied by the electrostatic charging unit 24, and an intensity by which the latent image can not be recorded.

Each of the semiconductor laser devices shown below of the light scanning unit 21 is intensity modified in correspondence to the laser modifying signal, and emits light so as to record the electrostatic latent image at a predetermined position of the photosensitive drum 23 in correspondence to the predetermined image data. The light emitted from the semiconductor laser device is deflected to a first direction corresponding to the same direction as the direction of the reading line of the scanner portion 10 by a deflecting unit described below within the light scanning unit 21, and is irradiated to the predetermined position X on the outer periphery of the photosensitive drum 23.

Thereafter, the photosensitive drum 23 is rotated in the direction of the arrow at the predetermined speed, whereby the first carriage 11 and the second carriage 12 of the scanner portion 10 are moved along the (document) table 15, and the laser beam emitted from the semiconductor laser device which is sequentially deflected by the deflecting unit is exposed in the same manner at a predetermined interval on the outer periphery of the photosensitive drum 23 at every one line.

In the manner mentioned above, the electrostatic latent image corresponding to the image signal is formed on the outer periphery of the photosensitive drum 23.

The electrostatic latent forming the image on the outer periphery of the photosensitive drum 23 is developed by the toner fed from the developing unit 25, is conveyed to a position opposing to the transfer unit 26 in accordance with the rotation of the photosensitive drum 23. The developed image is transferred on the recording paper P taken out at one sheet by a paper feed roller 30 and a separating roller 31 from a recording paper P holding cassette 29, and supplied with being timing aligned by an aligning roller 32 due to the electric field from the transfer unit 26.

The recording paper P on which the toner image is transferred is separated together with the toner by the separating unit 27, and is guided to a fixing unit 34 by a conveying unit 33.

The recording paper P guided to the fixing unit 34 is discharged to a tray 36 by a paper discharge roller 35 after the toner (the toner image) is fixed thereto due to a heat and a pressure output from the fixing unit 34.

On the contrary, the photosensitive drum 23 after transferring the toner image (the toner) on the recording paper P by the transfer unit 26 is opposed to the cleaning unit 28 as a result of a consecutive rotation, the transfer residual toner (the residual toner) left on the outer periphery is removed, and the photosensitive drum 23 is returned to an initial state before the surface potential is supplied by the electrostatic charging unit 24, whereby the next image formation can be performed.

The process mentioned above is repeated, whereby the continuous image forming operation can be performed.

As mentioned above, the image information is read by the scanner portion 10 and the read image information is converted into the toner image in the printer portion 20 so as to be output to the recording paper P, whereby the document D set on the document table 15 is copied.

In this case, the description of the image forming apparatus mentioned above is given of the embodiment of the digital copying machine, however, may be given, for example, of a printer unit having no image reading portion.

Figure 2A:
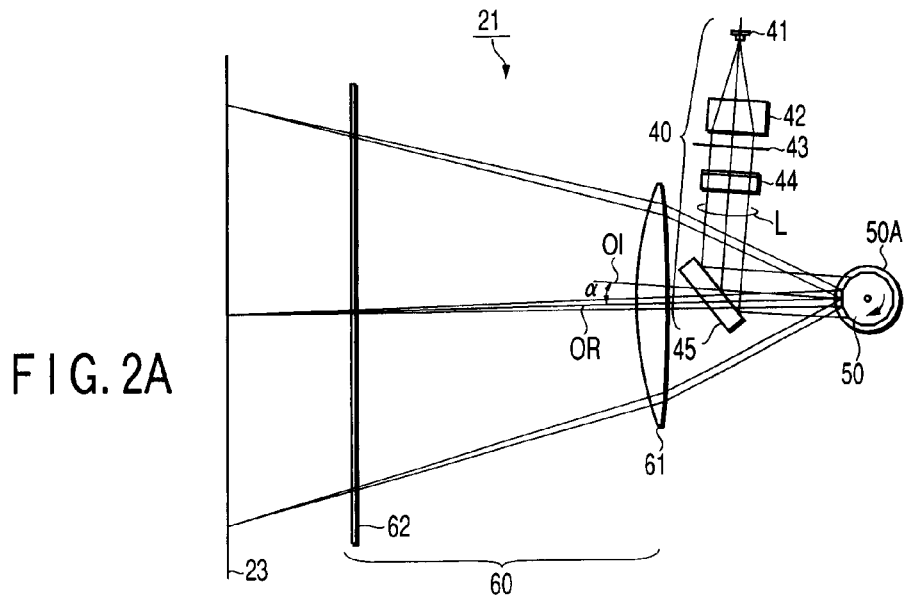
FIGS. 2A and 2B are schematic views describing the light scanning unit assembled in the image forming apparatus shown in FIG. 1.
Figure 2B:
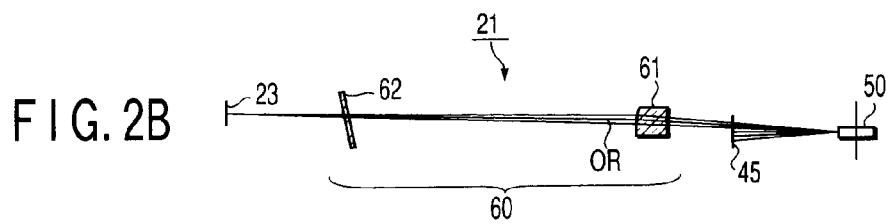

FIGS. 2A and 2B are schematic views describing a structure of the light scanning unit shown in FIG. 1.

FIG. 2A is a schematic plan view describing an optical device arranged between the light source (the semiconductor laser device) included in the light scanning unit and the photosensitive drum (the subject to be scanned) by being viewed from a direction perpendicular to the main scanning direction (the first direction) corresponding to a direction parallel to the direction in which the light beam moving toward the photosensitive drum from the light deflecting unit (the polygon mirror) is scanned by the light deflecting unit and developing a turn up by a mirror, and FIG. 2B is a schematic cross sectional view showing so that the sub scanning direction (the second direction) perpendicular to the direction shown in FIG. 2A, that is, the main scanning direction becomes a flat surface.

As shown in FIGS. 2A and 2B, the light scanning unit 21 has a pre-deflection optical system 40 including a semiconductor laser device (a light source) 41 emitting a laser beam (a light beam) L having, for example, 780 nm, a finite focus lens or a collimate lens 42 aligning the cross sectional beam shape of the laser beam L emitted from the semiconductor laser device 41 to a predetermined shape and size, an aperture 43 limiting a quantity of light (a light flux width) of the laser beam L passing through the finite focus lens or the collimate lens 42 to a predetermined magnitude, a cylindrical lens 44 to which a positive power is given only in the sub scanning direction in order to align the cross sectional shape of the laser beam L in which the quantity of light is limited by the aperture 43, to a predetermined cross sectional beam shape, a mirror bending the laser beam L output from the semiconductor laser device 41 a cross sectional shape of which is aligned to the cross sectional beam shape by the finite focus lens or the collimate lens 42, the aperture 43 and the cylindrical lens 44, to a predetermined direction, and the like.

A polygon mirror (a light deflecting unit) 50 integrally formed with a polygon mirror motor 50A rotating at a predetermined speed and scanning the laser beam L in which the cross sectional beam shape is aligned to the predetermined shape by the cylindrical lens 44 toward the photosensitive drum (the surface to be scanned) 23 positioned at the later stage, is provided in the direction in which the laser beam L applied the predetermined cross sectional beam shape thereto by the pre-deflection optical system 40 moves.

An image forming optical system 60 for forming an image of the laser beam L continuously reflected by each of the reflective surfaces of the polygon mirror 50 in a substantially linear manner along the axial direction of the photosensitive drum 23 is provided between the polygon mirror 50 and the photosensitive drum 23.

The image forming optical system 60 is constituted by an image forming lens (normally called as an fθ lens) 61 which can irradiate the laser beam L continuously reflected by the individual reflective surfaces of the polygon mirror 50 from one end in a longitudinal (an axial) direction of the photosensitive drum 23 to another end at the exposure position X shown in FIG. 1 while proportioning the position on the photosensitive drum 23 at a time of being irradiated to the photosensitive drum 23 to an angle of rotation of each of the reflective surfaces of the polygon mirror 50, and can provide a convergence property to which a predetermined relation is given on the basis of an angle at which the polygon mirror 50 is rotated, so that a predetermined cross sectional beam diameter is achieved at any position in the longitudinal direction on the photosensitive drum 23, a dust-proof glass 62 for preventing the toner, dusts, paper powders and the like floating within the image forming portion 22 from entering within a housing (not shown) of the light scanning unit 21, and the like.

In this case, an optical path of the laser beam L from the semiconductor laser device 41 within the light scanning unit 21 to the photosensitive drum 23 is bent within a housing (not shown) of the light scanning unit 21 by a plurality of mirrors (not shown) or the like. Further, at least one of the image forming lens 61 and the mirror (not shown) may be integrally formed by optimizing a curvature in the main scanning direction and the sub scanning direction of the image forming lens 61 and the optical path between the polygon mirror 50 and the photosensitive drum 23.

Further, in the light scanning unit shown in FIGS. 2A and 2B, in the case of projecting an axis OI along which the main light beam of the incident laser beam directed to each of the reflective surfaces of the polygon mirror 50 is and an optical axis OR of the image forming optical system 60 on the main scanning plane, an angle α formed between the both is 5 degrees. Further, in a state of viewing the light scanning unit from the sub scanning cross section, an angle formed between an incident laser beam and the optical axis OR of the image forming optical system is 2 degrees.

Figure 3:
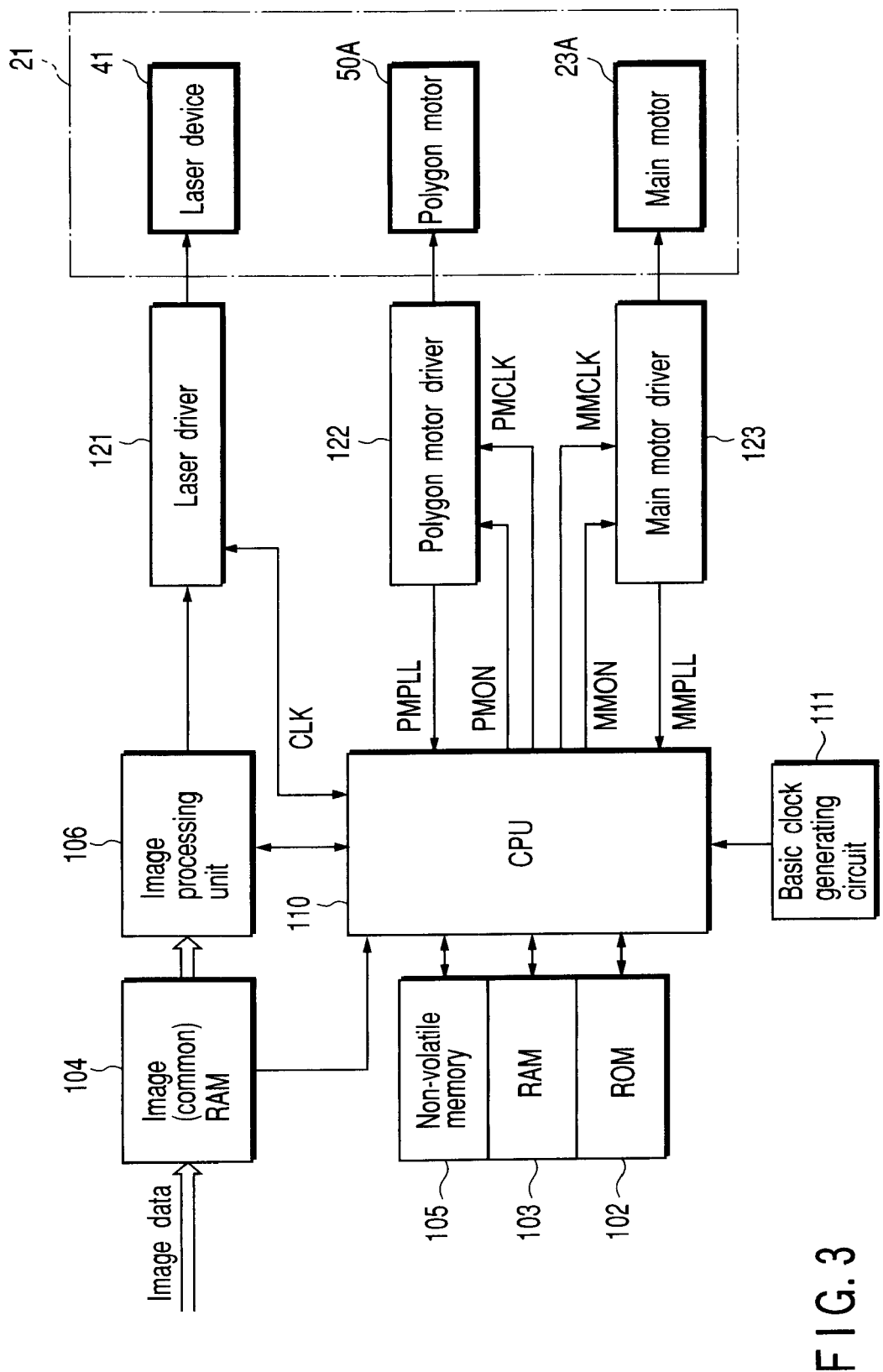
FIG. 3 is a schematic block diagram showing one example of a drive circuit of a digital copying machine including the light scanning unit shown in FIGS. 2A and 2B.

FIG. 3 is a schematic block diagram showing one example of a drive circuit of the digital copying unit including the light scanning unit shown in FIGS. 2A and 2B.

To a CPU 101 corresponding to a main control unit, a ROM (a read only memory) 102 in which a predetermined operating standard and an initial data are stored, a RAM 103 temporarily storing an input control data, a common (image) RAM 104 holding the image data output from the CCD sensor 14 or the image data supplied from the external unit and outputting the image data to an image processing circuit shown below, an NVM (a non-volatile memory) 105 to keep the data has been stored even in the case that an electricity applied to the copying machine 1 is shut together with a battery backup, an image processing unit 106 adding a predetermined image process to the image data stored in the image RAM 104 so as to output to a laser driver described below, and the like are connected.

To the CPU 101, a laser driver 121 irradiating the semiconductor laser device 41 of the light scanning unit 21, a polygon motor driver 122 driving a polygon motor 50A rotating the polygon mirror 50, a main motor driver 123 for driving a main motor 23A driving the photosensitive drum 23, a conveying mechanism for an incidental paper (a material to be transferred) and the like, and the like are further connected.

In the light scanning unit 21 shown in FIGS. 2A and 2B, the emanative laser beam L radiated from the semiconductor laser device 41 is converted by the finite focus lens or the collimate lens 42 so that the cross sectional beam shape has the convergence property or becomes substantially parallel (in rare cases, is emanative).

The laser beam L in which the cross sectional beam shape is converted into the predetermined shape passes through the aperture 43, whereby the light flux width and the quantity of light are set to be optimum, and the predetermined convergence property is applied only to the sub scanning direction by the cylindrical lens 44. Accordingly, the laser beam L becomes a linear shape extending in the main scanning direction on each of the reflective surfaces of the polygon mirror 50.

The polygon mirror 50 is formed, for example, in a regular dodecahedron, so that an inscribed circle diameter Dp is 29 mm. A width Wp in the main scanning direction of each of the reflective surfaces (12 surfaces) of the polygon mirror 50 can be calculated by the formula Wp=tan (π/N)× Dp in which the number of the reflective surfaces of the polygon mirror 50 is set to N. In this example, Wp=tan (π/12)×29=7.77 mm.

On the contrary, a beam width DL in the main scanning direction of the laser beam L irradiated to each of the reflective surfaces of the polygon mirror 50 is substantially 32 mm, and is set to be wider than the width Wp=7.77 mm in the main scanning direction of the individual reflective surfaces of the polygon mirror 50.

The laser beam L guide to each of the reflective surfaces of the polygon mirror 50 and scanned (deflected) in a linear manner by being continuously reflected due to the rotation of the polygon mirror 50 is given a predetermined image forming property so that the cross sectional beam diameter becomes substantially uniform at least with respect to the main scanning direction on the photosensitive drum 23 (the image surface) by the image forming lens 61 of the image forming optical system 60, and forms a substantially linear image on the surface of the photosensitive drum 23.

Correction is performed so that the angle of rotation of the individual reflective surface of the polygon mirror 50 and the image forming position, that is, the scanning position of the light beam forming the image on the photosensitive drum 23 have a proportional relation. Accordingly, the speed of the light beam linearly scanned on the photosensitive drum 23 by the image forming lens 61 becomes uniform in all the scanning area. In this case, the image forming lens 61 is given a curvature (a curvature in the sub scanning direction) capable of correcting a displacement of the scanning position in the sub scanning direction due to an influence that the respective reflective surfaces of the polygon mirror 50 are not individually parallel to each other with respect to the sub scanning direction, that is, a slant is generated in each of the reflective surfaces. The image forming lens 61 further corrects an image surface curve in the sub scanning direction. In order to correct the optical performance in the sub scanning direction, the curvature in the sub scanning direction is changed by the scanning position.

The shape of the lens surface of the image forming lens 61 is defined by TABLE 1 and the following formula (2), in which reference y denotes a main scanning direction, reference z denotes a sub scanning direction and reference x denotes an optical axial direction.

$$X = \frac{CUY*y^2 + CUZ*z^2}{1+\sqrt{1-AY*CUY^2*y^2 - AZ*CUZ^2*z^2}} + \sum_{n=0}\sum_{m=0} A_{mn}y^m z^{2n} \quad (2)$$

TABLE 1

Incident surface

| CUY | CYZ | AY | AZ |
|---|---|---|---|
| −5.672E−03 | −4.660E−03 | 1 | 1 |

| | | m | | | | | |
|---|---|---|---|---|---|---|---|
| | | 0 | 1 | 2 | 3 | 4 | 5 |
| n | 0 | 0.000E+00 | 2.787E−03 | 1.980E−03 | 1.335E−07 | 1.044E−07 | −2.786E−11 |
| | 1 | 4.553E−03 | 1.328E−06 | −2.476E−07 | 5.778E−10 | 9.129E−11 | −1.236E−14 |
| | 2 | 5.619E−06 | −7.489E−09 | −8.817E−10 | 1.685E−12 | −6.660E−14 | −5.188E−16 |

| | | m | | | | |
|---|---|---|---|---|---|---|
| | | 6 | 7 | 8 | 9 | 10 |
| n | 0 | −7.059E−12 | 3.692E−15 | 1.841E−16 | −6.741E−20 | −1.779E−20 |
| | 1 | −7.811E−15 | −2.800E−18 | 3.600E−19 | 6.332E−22 | 8.659E−24 |
| | 2 | 9.075E−18 | 1.148E−19 | 5.498E−21 | −5.670E−24 | −3.951E−25 |

Emitting surface

| CUY | CYZ | AY | AZ |
|---|---|---|---|
| 5.092E−03 | 1.651E−02 | 1 | 1 |

| | | m | | | | | |
|---|---|---|---|---|---|---|---|
| | | 0 | 1 | 2 | 3 | 4 | 5 |
| n | 0 | 0.000E+00 | −1.071E−03 | −8.388E−04 | 1.647E−07 | 5.067E−08 | −2.561E−11 |
| | 1 | 3.809E−03 | 9.143E−07 | −3.924E−07 | 5.036E−10 | 4.401E−11 | −2.248E−14 |
| | 2 | 2.945E−06 | −4.016E−09 | −1.720E−10 | 2.644E−13 | −3.675E−14 | −4.145E−17 |

| | | m | | | | |
|---|---|---|---|---|---|---|
| | | 6 | 7 | 8 | 9 | 10 |
| n | 0 | −4.086E−12 | 1.397E−15 | 1.539E−16 | 1.951E−19 | −4.158E−20 |
| | 1 | −5.812E−16 | 4.130E−18 | −1.228E−19 | 2.809E−22 | 9.314E−24 |
| | 2 | −1.222E−17 | 1.238E−20 | 3.609E−21 | 1.408E−24 | 7.214E−26 |

Further, a material of the image forming lens 61 is an acrylic (PMMA), and a refractive index n is 1.483987 with respect to the laser beam having a wavelength of 780 nm. Further, a thickness of the image forming lens 61 is 24 mm in a defocus direction on the optical axis (the direction along which the laser beam moves forward), and a height in the sub scanning direction is 25 mm.

Since the angle of rotation θ of the individual reflective surface of the polygon mirror 50 and the position of the laser beam L forming the image on the photosensitive drum 23 are substantially made proportion to each other by using the image forming lens 61 mentioned above, it is possible to correct the position at a time when the laser beam L forms the image on the photosensitive drum 23.

The image forming lens 61 can correct the position displacement in the sub scanning direction generated due to the deviation of the slant in the sub scanning direction between the respective reflective surfaces of the polygon mirror 50, that is, the dispersion of the surface slant amount. More particularly, the incident surface (the side of the polygon mirror 50) and the emitting surface (the side of the photosensitive drum 23) of the laser beam in the image forming lens 61 are set to have an optically conjugate relation, whereby even in the case that an incline defined between an optional reflective surface of the polygon mirror 50 and an axis of rotation of the polygon mirror 50 is different (at every individual reflective surfaces), it is possible to correct the displacement of the scanning position in the sub scanning direction of the laser beam L guided on the photosensitive drum 23.

Further, the image surface curve in the sub scanning direction and the curve of the scanning line in the sub scanning direction can be corrected by the image forming lens 61. In order to correct these, the curvature in the sub scanning direction of the image forming lens 61 is varied in correspondence to the scanning position.

In this case, since the cross sectional beam diameter of the laser beam L depends upon the wavelength of the light beam L which the semiconductor laser device 41 radiates, it is possible to further reduce the cross sectional beam diameter of the laser beam L by setting the wavelength of the laser beam L to 650 nm or 630 nm or a shorter wavelength.

Figure 4:
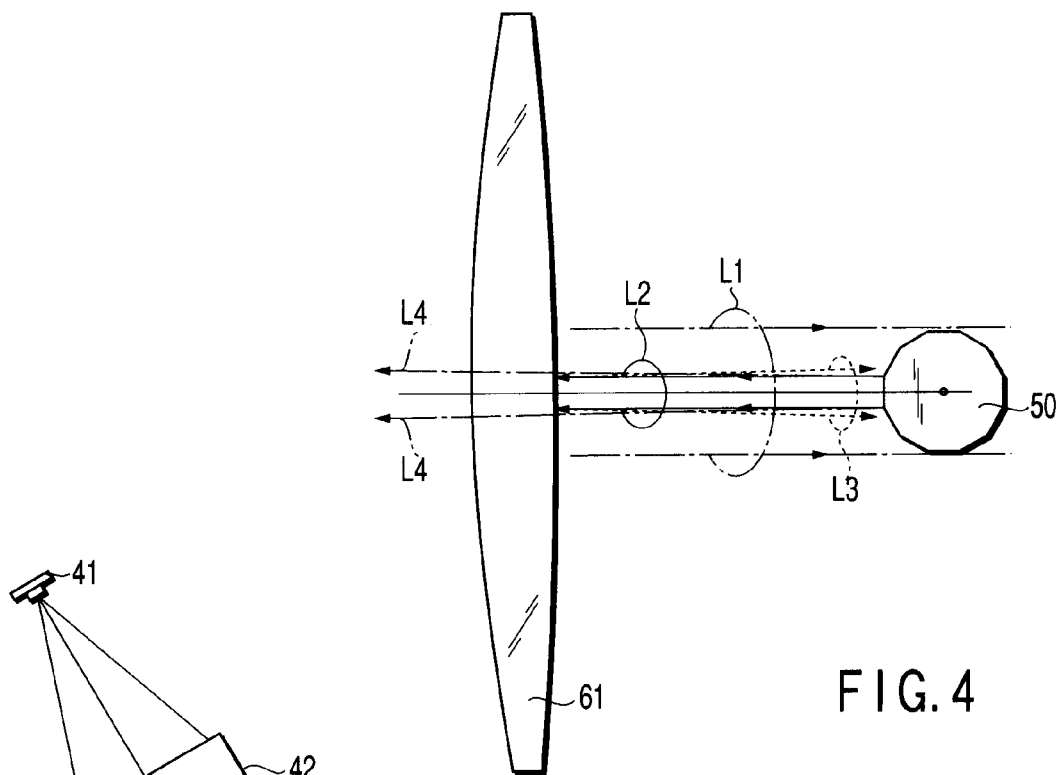
FIG. 4 is a schematic view describing a state of oscillating a laser beam between an individual reflective surface of a polygon mirror and an image forming lens in the light scanning unit of the over illumination type shown in FIGS. 2A and 2B.

FIG. 4 is a schematic view describing a state of oscillating the laser beam between the individual reflective surfaces of the polygon mirror and the image forming lens in the light scanning unit of the over illumination type shown in FIGS. 2A and 2B.

As shown in FIG. 4, in the case that the laser beam L incident onto the individual reflective surfaces of the polygon mirror 61 is incident from a substantially front surface of an optional reflective surface of the polygon mirror 61 within the main scanning plane, a laser beam L1 incident to each of the reflective surfaces of the polygon mirror 50 is continuously reflected by the optional reflective surface of the polygon mirror so as to become an image laser beam L2. The image laser beam L2 is reflected by the lens surface of the image forming lens 61 so as to become a reflected laser beam L3.

The reflected laser beam L3 emitted from the lens surface of the image forming lens 61 is returned to the individual reflective surfaces of the polygon mirror 50 and is reflected by the surface in which the reflected light serves as the image area among the individual reflective surfaces of the polygon mirror 50, so as to become a reflected laser beam L4 directing toward the image forming lens 61.

When the reflected laser beam L4 again reflected by the surface in which the reflected light of the polygon mirror 50 serves as the image area after oscillating between the optional reflective surface of the polygon mirror 50 and the lens surface of the image forming lens 61 in the manner mentioned above forms the image in the image area on the photosensitive drum 23 by the image forming lens 61, the image quality of the output image is deteriorated. In this case, the light intensity of the reflected laser beam L3 reflected by the lens surface of the image forming lens 61 becomes particularly significant in the case that a coating (a reflection preventing film) for improving a light transmittance is not formed on the lens surface of the image forming lens 61. Further, even when the image forming lens 61 is a glass lens on which the reflection preventing film can be provided, in the case of being formed by a material having a low glass transition temperature, the surface accuracy of the lens surface is easily deteriorated (changed) in a process of providing the reflection preventing film, so that there is a problem that the optical performance is deteriorated.

In order to prevent the quality of the image from being deteriorated by the laser beam (L4) oscillating between the optional reflective surface of the polygon mirror 50 and the lens surface of the image forming lens 61, it is necessary that the incident laser beam incident to the individual reflective surfaces of the polygon mirror 50 is incident to the optical axis of the image forming lens 61 on the main scanning cross section from a direction of an optional angle (it is necessary to give a slant between the optical axis of the image forming lens 61 and the incident laser beam incident to the individual reflective surfaces of the polygon mirror 50).

Figure 5:
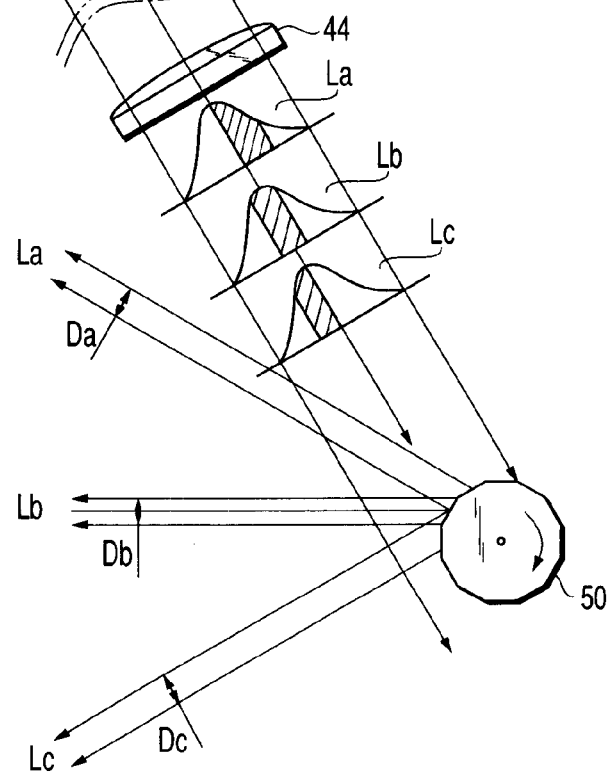
FIG. 5 is a schematic view describing a relation between a scanning position of the laser beam scanned on the basis of a rotation of the individual reflective surface of the polygon mirror in the light scanning unit of the over illumination type shown in FIGS. 2A and 2B and a width of light flux in a main scanning direction of the laser beam.

However, in the case that the slant mentioned above exists between the optical axis of the image forming lens 61 and the incident laser beam incident to the individual reflective surfaces of the polygon mirror 50, when widths in the main scanning direction of laser beams La, Lb and Lc scanned by the respective reflective surfaces of the polygon mirror 50 are respectively set to Da, Db and Dc, as shown in FIG. 5, a relation in size (a relation in length) of the width in the main scanning direction of each of the reflected laser beams establishes a relation Da>Db>Dc. That is, when setting a focal distance of a whole of the image forming optical system 60 to f, and setting a diameter (a width) in the main scanning direction of the light beam reflected by the optional reflective surface of the polygon mirror 50 to Dx, it is well known that an F number Fn defined by f/Dx varies in correspondence to a scanning angle.

Since the cross sectional beam diameter of the laser beam forming the image at the predetermined position of the photosensitive drum 23 is substantially in proportion to the F number Fn, a relation $\omega a < \omega b < \omega c$ is established, in which the beam diameters on the photosensitive drum 23 are respectively set to $\omega a$, $\omega b$ and $\omega c$.

Accordingly, in the case that the slant mentioned above exists between the optical axis of the image forming lens 61 and the incident laser beam incident to each of the reflective surfaces of the polygon mirror 50, the dispersion is generated in the cross sectional beam diameter of the laser beam due to the image forming position (the scanning position) on the photosensitive drum 23, so that the quality of the image recorded on the photosensitive drum 23 is deteriorated.

In this case, since the cross sectional beam diameter $\omega$ of the laser beam forming the image on the photosensitive drum 23 can be also expressed by the relation $\omega \approx \lambda/(\pi \tan \phi)$, in which a convergence angle (an angle formed between a center light of the laser beam and an outer edge of the laser beam) is set to $\phi$, and a wavelength of the laser beam is set to $\lambda$, in order to reduce the dispersion of the cross sectional beam diameter $\omega$, it is necessary to reduce the dispersion of the convergence angle $\phi$ at a time when the laser beam is converged (forms the image) on the photosensitive drum 23.

Figure 6A:
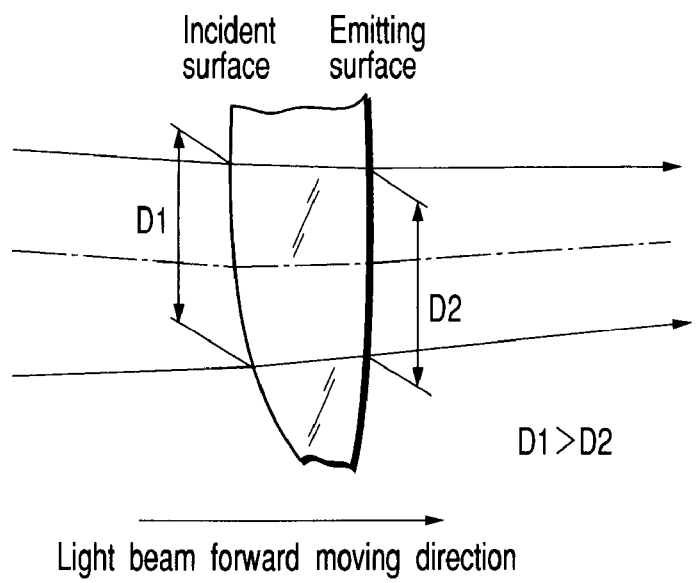
FIGS. 6A and 6B are schematic views describing a principle on which a degree of dispersion of a cross sectional beam diameter of the laser beam forming the image on a photosensitive drum can be restricted by using the light scanning unit of the over illumination type shown in FIGS. 2A and 2B so as to reduce a dispersion in an angle of convergence around a whole scanning area in the main scanning direction.
Figure 6B:
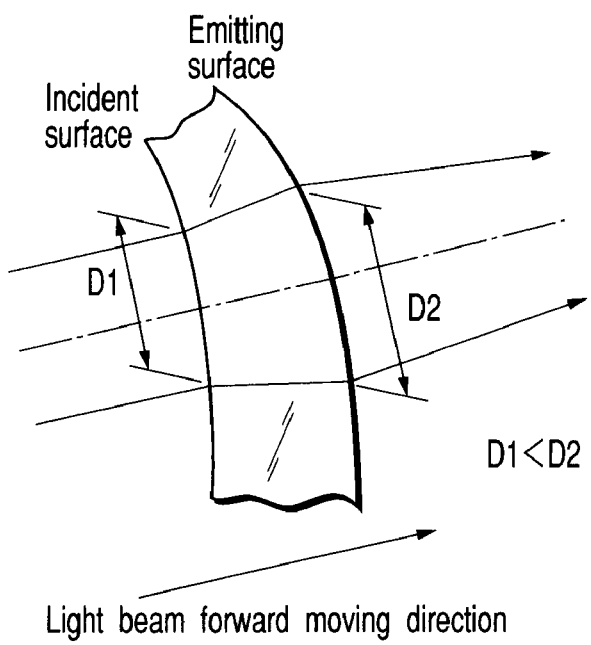

FIGS. 6A and 6B are schematic views describing a principle on which the dispersion of the cross sectional beam diameter of the laser beam forming the image on the photosensitive drum can be restricted by reducing the dispersion in the angle of convergence around the whole scanning area in the main scanning direction (a feature of the image forming lens shape).

FIG. 6A is a schematic view describing a characteristic of a laser beam passing through the image forming lens 61 applicable in the case that the cross sectional beam diameter on the individual reflective surface of the polygon mirror 50 is large, that is, the F number Fn is small. In this case, this state corresponds to a relation between the laser beam La shown in FIG. 5 and the optional reflective surface of the polygon mirror 50.

As shown in FIG. 6A, with respect to the main scanning direction of the image forming lens 61, by setting the characteristic of the image forming lens 61 so that the diameter (the width) D2 of the emitting laser beam is smaller than the diameter (the width) D1 of the incident laser beam, the angle of convergence 4 of the laser beam reaching the photosensitive drum 23 (the image surface) becomes small. Accordingly, the width (the beam diameter of the laser beam) in the main scanning direction of a scanning line (the latent image) scanned on the photosensitive drum 23 (the image surface) becomes larger than the case of using no image forming lens 61.

It goes without saying that in order to make it possible to make the diameter D2 of the emitting laser beam smaller than the diameter D1 of the incident laser beam, as shown in FIG. 6A, the characteristic of the portion of the image forming lens 61, particularly the shape of the incident surface becomes in a convex lens shape. In this case, the shape of the emitting surface is defined as a shape which can coincide a combined focus position provided by the image forming optical system 60 with a predetermined position (an image surface) on the surface of the photosensitive drum 23 or a portion near the same.

FIG. 6B is a schematic view describing a characteristic of a laser beam passing through the image forming lens 61 applicable in the case that the cross sectional beam diameter on the individual reflective surface of the polygon mirror 50 is large, that is, the F number Fn is small. In this case, this state corresponds to a relation between the laser beam Lc shown in FIG. 5 and the optional reflective surface of the polygon mirror 50.

As shown in FIG. 6B, with respect to the main scanning direction of the image forming lens 61, by setting the characteristic of the image forming lens 61 so that the diameter (the width) D2 of the emitting laser beam is larger than the diameter (the width) D1 of the incident laser beam, the angle of convergence φ of the laser beam reaching the photosensitive drum 23 (the image surface) becomes large. Accordingly, the width (the beam diameter of the laser beam) in the main scanning direction of a scanning line (the latent image) scanned on the photosensitive drum 23 (the image surface) becomes smaller than the case of using no image forming lens 61.

It goes without saying that in order to make it possible to make the diameter D2 of the emitting laser beam larger than the diameter D1 of the incident laser beam, as shown in FIG. 6B, the characteristic of the portion of the image forming lens 61, particularly the shape of the incident surface becomes in a concave lens shape. In this case, the shape of the emitting surface is defined as a shape which can coincide a combined focus position provided by the image forming optical system 60 with a predetermined position (an image surface) on the surface of the photosensitive drum 23 or a portion near the same. In this case, even when the shape of the incident surface of the image forming lens 61 is formed in the convex lens shape, in the case that the curvature thereof is small, the same effect as that of the case that the shape of the incident surface is formed in the concave lens shape.

As mentioned above, in the main scanning direction, by changing the respective curvatures of the lens shape of the incident surface and the lens shape of the emitting surface of the image forming lens 61 in correspondence to the position at which the laser beam is scanned so as to change the rate thereof, it is possible to reduce the dispersion of the angle of convergence of the laser beam scanned on the photosensitive drum 23. As a result, it is possible to make the cross sectional beam diameter of the laser beam uniform all around the area in the longitudinal direction of the scanning line scanned on the photosensitive drum 23.

As mentioned above, in order to avoid deterioration of the image quality generated by the matter that the reflected laser beam reflected by the lens surface of the image forming lens oscillates between the respective reflective surfaces of the polygon mirror so as to be incident to the image forming lens, the change of the cross sectional beam diameter in the main scanning direction of the laser beam generated in the case that the laser beam is incident to the individual reflective surfaces of the polygon mirror within the main scanning plane at the predetermined angle with respect to the optical axis of the image forming optical system is made uniform by setting the respective lens surface shapes in the main scanning direction of the image forming lens asymmetrical with respect to the main scanning direction (by changing the respective curvatures of the lens shape of the incident surface and the lens shape of the emitting surface of the image forming lens 61 in correspondence to the position at which the laser beam is scanned, so as to change the rate of the same). In this case, the shapes of the respective lens surfaces mentioned above can be achieved by setting an aspherical surface term in the formula (2) to ym and involving an odd number term in m.

As mentioned above, by changing the respective curvature of the surface shapes of the incident surface and the emitting surface of the image forming lens in correspondence to the position at which the laser beam is scanned, in all the scanning area in the main scanning direction, so as to change the rate thereof, it is possible to correct the dispersion of the F number Fn and it is possible to make the cross sectional beam diameter of the laser beam uniform in all the scanning area.

Further, in the conventional light scanning unit, with respect to the main scanning direction, in order to maintain the angle of convergence constant, a lot of optical parts having power are required, however, in accordance with the present invention, it is possible to set the cross sectional beam diameter of the laser beam forming the image at the predetermined position of the photosensitive drum 23 to be substantially uniform all around the area of the length in the main scanning direction by a reduced optical parts.

In this case, the optical parts in which the asymmetrical surface is defined in the main scanning direction mentioned above is not limited to the lens, and the same effect can be also obtained by an optical part such as a mirror surface having a power or the like.

Further, if the optical part mentioned above in which the asymmetrical surface is defined in the main scanning direction is a lens and is made of a glass, a refractive index is high and it is easy to correct various characteristics. In this case, since the matter that the optical part is made of glass is hard to be affected by a moisture absorption and a change of peripheral temperature, it is further advantageous. In this case, if the lens surface shape becomes complex, a working time required for a cutting work and a polishing work is increased and a cost is increased very much, so that a molding work is preferable.

Figure 7:
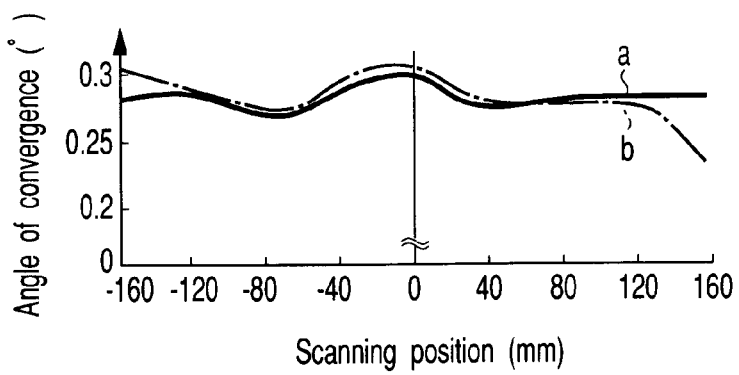
FIG. 7 is a graph showing a result of comparing a state of a dispersion in an angle of convergence φ with respect to the position in the main scanning direction in the light scanning unit described by using FIGS. 2A and 2B, with setting a range between −160 mm and 160 mm to an image area on the photosensitive drum, with a well-known light scanning unit.

FIG. 7 is a graph showing a result of comparing a state of a dispersion in an angle of convergence φ with respect to the position in the main scanning direction among the optical performances obtained by employing the light scanning unit described by using FIGS. 1, 2A, 2B and 3, with setting a range between −160 mm and 160 mm to an image area on the photosensitive drum, with a well-known light scanning unit. In this case, in FIG. 7, a curve a shows a characteristic obtained by the light scanning unit to which the embodiment in accordance with the present invention is applied, and a curve (a one-dot chain line) b shows a characteristic obtained by the well-known light scanning unit employing the symmetrical image forming lens, respectively. In this case, the image forming lens of the symmetrical shape used in the well-known light scanning unit corresponds to the case that all of coefficients in the odd number term of ym in the formula (2) are "0". As shown in FIG. 7, in the light scanning unit in accordance with the present invention, in an opposite scanning end (in this case, "+" direction) having an angle of incidence in the main scanning direction of the laser beam incident to the respective reflective surfaces of the polygon mirror 50, the F number Fn becomes large and the angle of convergence becomes small, as is previously described.

In accordance with FIG. 7, it is known that a width of deflection of the angle of convergence φ is reduced as shown by the curve a, by employing the image forming lens 61 in accordance with the present invention in which the asymmetrical surface is defined in the main scanning direction. In particular, it is deemed that an effect is high at the scanning end.

Figure 8:
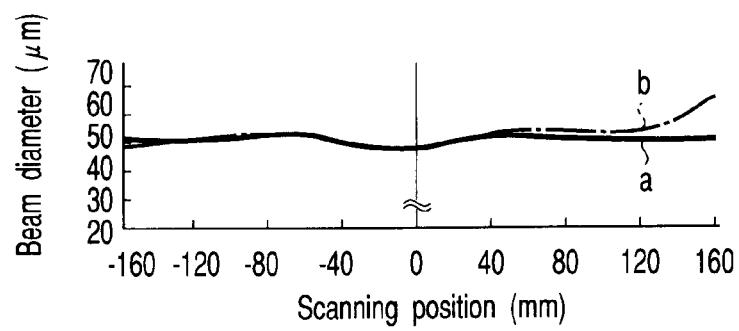
FIG. 8 is a graph showing a result of comparing a change of the cross sectional beam diameter of the laser beam forming the image on the photosensitive drum in the light scanning unit described by using FIGS. 2A and 2B with setting the range between −160 mm and 160 mm to the image area on the photosensitive drum, with the well-known light scanning unit.

FIG. 8 is a graph showing a result of comparing a change of the cross sectional beam diameter of the laser beam forming the image on the photosensitive drum among the optical performances obtained by employing the light scanning unit described by using FIGS. 1, 2A, 2B and 3 with setting the range between −160 mm and 160 mm to the image area on the photosensitive drum, with the well-known light scanning unit. In this case, in FIG. 8, a curve a shows a characteristic obtained by the light scanning unit to which the embodiment in accordance with the present invention is applied, and a curve (a one-dot chain line) b shows a characteristic obtained by the well-known light scanning unit employing the symmetrical image forming lens, respectively.

In accordance with FIG. 8, it is known that a degree of deflection of the cross sectional beam diameter in the main scanning direction is restricted as shown by the curve a, by employing the image forming lens 61 in accordance with the present invention in which the asymmetrical surface is defined in the main scanning direction. In particular, the effect is high at the scanning end.

Figure 9:
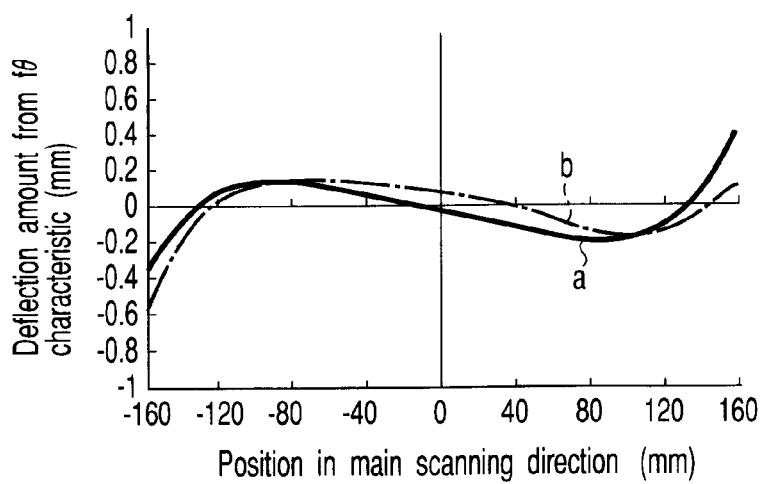
FIG. 9 is a graph showing a result of comparing a state of an fθ characteristic in the main scanning direction in the light scanning unit described by using FIGS. 2A and 2B, with setting the range between −160 mm and 160 mm to the image area on the photosensitive drum, with the well-known light scanning unit.

FIG. 9 is a graph showing a deviation of a linear property between the position of the laser beam forming the image on the photosensitive drum and the angle of rotation of the polygon mirror among the optical performances obtained by employing the light scanning unit described by using FIGS. 1, 2A, 2B and 3, that is, an fθ characteristic corresponding to an amount of deflection (a deviation of distance difference (an expansion and compression of image) among an optical axis position of the image forming optical system, a theoretical main scanning direction position (a length) and a position at which the laser beam is actually scanned) between a scanning position (a target position) and a designed position in the case that a linear property exists between the angle of rotation of the polygon mirror and the scanning position. In this case, in FIG. 9, the curve a shows a characteristic obtained by the light scanning unit to which the embodiment in accordance with the present invention is applied, and a curve (a one-dot chain line) b shows a characteristic obtained by the well-known light scanning unit employing the symmetrical image forming lens, respectively.

In accordance with FIG. 9, it is deemed that by using the image forming lens 61 in accordance with the present invention in which the asymmetrical surface is defined in the main scanning direction, as shown by the curve a, with respect to the fθ characteristic in the main scanning direction, a bilaterally symmetric property can be improved, and a total balance is improved. Further, a maximum value of a changing amount is a little improved.

Figure 10A:
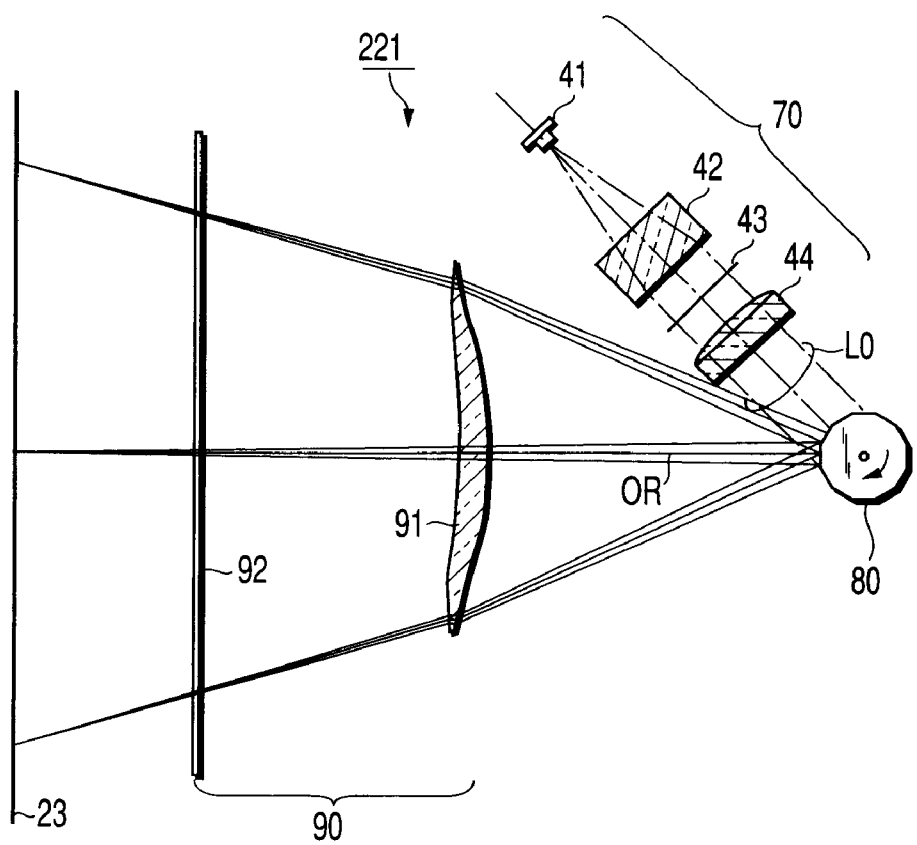
FIGS. 10A and 10B are schematic views describing another embodiment of a light scanning unit described by using FIGS. 2A and 2B.
Figure 10B:
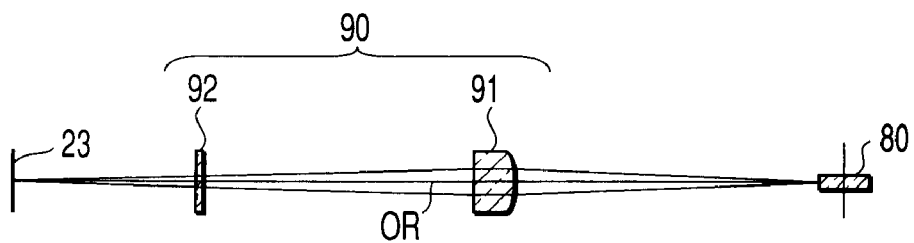

FIGS. 10A and 10B are schematic views describing another embodiment of a light scanning unit shown in FIGS. 2A and 2B. In this case, the same reference numerals are attached to the same elements as those already described by using FIGS. 2A and 2B, and a detailed description will be omitted.

A light scanning unit 71 shown in FIGS. 10A and 10B is constituted by a pre-deflection optical system 70 having the semiconductor laser device 41, the finite focus lens or the collimate lens 42, the aperture 43, the cylindrical lens 44 and the like, a polygon mirror 80 in which an inscribed circle has a diameter of 25 mm and is formed in a regular dodecahedron shape, an image forming optical system 90 having an image forming lens 91, a dust-proof glass 62 and the like, and the like.

In the light scanning unit 71 shown in FIGS. 10A and 10B, the laser beam from the semiconductor laser device 41 is incident to the respective reflective surfaces of the polygon mirror 80 from an outer side of the scanning area having a predetermined angle within the main scanning surface with respect to the optical axis OR of the image forming optical system 90.

In this case, an angle a between the optical axis OI in the incident side through which the laser beam directed to the polygon mirror 80 passes, and the optical axis OR of the image forming optical system 90 is, for example, 46.42 degrees, and an angle formed by an incident laser beam L0 (including the optical axis OR) and the scanning plane at a time of viewing the both from the sub scanning cross section is 0 degree.

Further, the image forming lens 91 has a refractive index n is 1.483987 and is formed of an acrylic, and a thickness in a defocus direction on the optical axis is 15 mm. In this case, the shape of the lens surface can be defined by applying the data in TABLE 2 shown below to the formula (2) previously described.

TABLE 2

| | | Incident surface | | | |
|---|---|---|---|---|---|
| | | CUY | CYZ | AY | AZ |
| | | −0.0047 | −0.0039 | 1 | 1 |

| | | m | | | |
|---|---|---|---|---|---|
| | | 0 | 1 | 2 | 3 | 4 |
| n | 0 | 0.00E+00 | −4.41E−03 | −2.71E−04 | 4.32E−07 | 1.17E−07 |
| | 1 | 1.75E−02 | 1.62E−06 | −2.71E−06 | 3.57E−10 | 9.86E−11 |

| | | m | | | |
|---|---|---|---|---|---|
| | | 5 | 6 | 7 | 8 |
| n | 0 | −2.72E−11 | −1.52E−12 | 8.03E−16 | −2.34E−18 |
| | 1 | 1.56E−14 | 1.02E−15 | −1.55E−18 | 4.56E−20 |

TABLE 2-continued

| | Emitting surface | | |
|---|---|---|---|
| CUY | CYZ | AY | AZ |
| 0.0059 | −0.0036 | 1 | 1 |

| | | | m | | | |
|---|---|---|---|---|---|---|
| | | 0 | 1 | 2 | 3 | 4 |
| n | 0 | 0.00E+00 | 5.70E−03 | −4.30E−03 | 4.60E−07 | 7.22E−08 |
| | 1 | 2.44E−02 | 3.38E−06 | −1.69E−06 | −3.36E−12 | −7.89E−12 |

| | | m | | | |
|---|---|---|---|---|---|
| | | 5 | 6 | 7 | 8 |
| n | 0 | −1.58E−11 | −7.62E−13 | 5.08E−16 | −4.76E−17 |
| | 1 | 8.52E−15 | 1.07E−15 | 1.55E−18 | 2.88E−19 |

Figure 11:
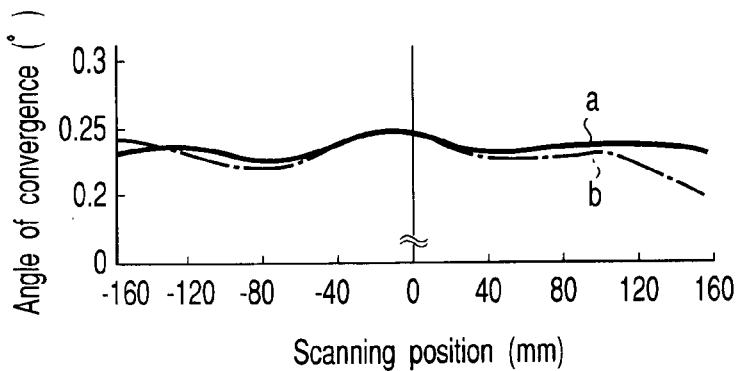
FIG. 11 is a graph showing a result of comparing a state of a dispersion in an angle of convergence φ with respect to the position in the main scanning direction in the light scanning unit described by using FIGS. 10A and 10B, with setting a range between −160 mm and 160 mm to an image area on the photosensitive drum, with a well-known light scanning unit.
Figure 12:
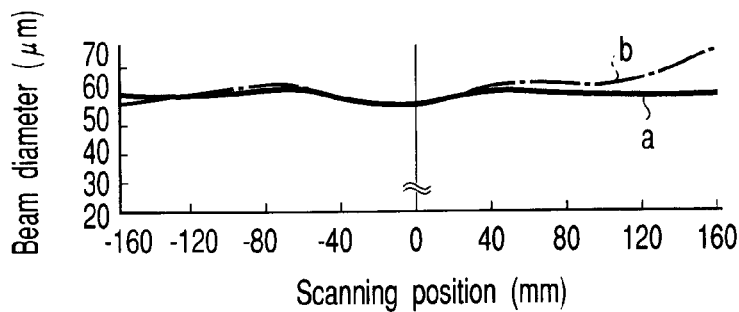
FIG. 12 is a graph showing a result of comparing a change of the cross sectional beam diameter of the laser beam forming the image on the photosensitive drum in the light scanning unit described by using FIGS. 10A and 10B with setting the range between −160 mm and 160 mm to the image area on the photosensitive drum, with the well-known light scanning unit.
Figure 13:
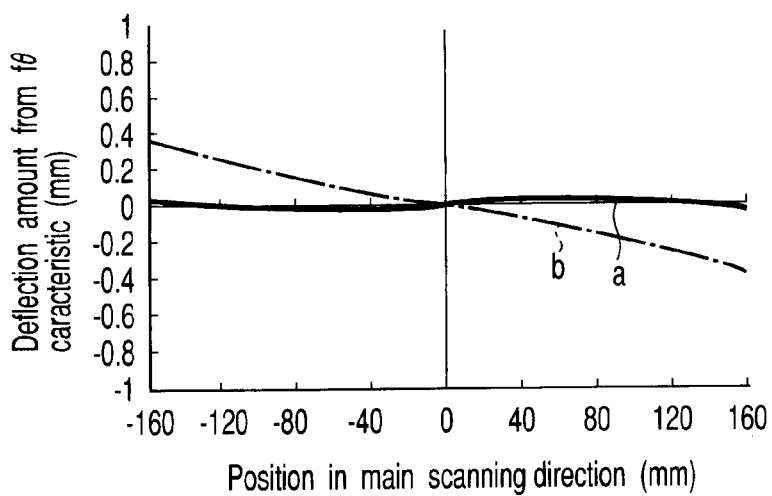
FIG. 13 is a graph showing a result of comparing a state of an fθ characteristic in the main scanning direction in the light scanning unit described by using FIGS. 10A and 10B, with setting the range between −160 mm and 160 mm to the image area on the photosensitive drum, with the well-known light scanning unit.

FIGS. 11 to 13 are graphs describing various optical performances obtained by employing the light scanning unit described by using FIGS. 10A and 10B.

FIG. 11 is a graph showing a result of comparing a state of a dispersion in an angle of convergence $\phi$ with respect to the position, with setting a range between −160 mm and 160 mm to an image area on the photosensitive drum, with a well-known light scanning unit. In this case, in FIG. 11, a curve a shows a characteristic obtained by the light scanning unit to which the embodiment in accordance with the present invention is applied, and a curve (a one-dot chain line) b shows a characteristic obtained by the well-known light scanning unit employing the symmetrical image forming lens, respectively. In accordance with FIG. 11, it is known that a width of deflection of the angle of convergence $\phi$ is reduced as shown by the curve a, by employing the image forming lens 91 in accordance with the present invention in which the asymmetrical surface is defined in the main scanning direction. In particular, it is deemed that an effect is great at the scanning end.

FIG. 12 is a graph showing a result of comparing a change of the cross sectional beam diameter of the laser beam forming the image on the photosensitive drum at a time of setting the range between −160 mm and 160 mm to the image area on the photosensitive drum, with the well-known light scanning unit. In this case, in FIG. 12, a curve a shows a characteristic obtained by the light scanning unit to which the embodiment in accordance with the present invention is applied, and a curve (a one-dot chain line) b shows a characteristic obtained by the well-known light scanning unit employing the symmetrical image forming lens, respectively. In accordance with FIG. 12, it is known that a degree of deflection of the cross sectional beam diameter in the main scanning direction is restricted as shown by the curve a, by employing the image forming lens 91 in accordance with the present invention in which the asymmetrical surface is defined in the main scanning direction.

FIG. 13 shows a deviation of a linear property between the position of the laser beam forming the image on the photosensitive drum and the angle of rotation of the polygon mirror, that is, an fθ characteristic corresponding to an amount of deflection (a deviation of distance difference (an expansion and compression of image) among an optical axis position of the image forming optical system, a theoretical main scanning direction position (a length) and a position at which the laser beam is actually scanned) between a scanning (target) position and a designed position in the case that a linear property exists between the angle of rotation of the polygon mirror and the scanning position. In this case, in FIG. 13, the curve a shows a characteristic obtained by the light scanning unit to which the embodiment in accordance with the present invention is applied, and a curve (a one-dot chain line) b shows a characteristic obtained by the well-known light scanning unit employing the symmetrical image forming lens, respectively.

In accordance with FIG. 13, it is deemed that by using the image forming lens 91 in accordance with the present invention in which the asymmetrical surface is defined in the main scanning direction, as shown by the curve a, with respect to the fθ characteristic in the main scanning direction, a bilaterally symmetric property can be improved, and a total balance is improved.

In this case, in the light scanning unit shown in FIGS. 10A and 10B, when setting the coefficient in the case that the m in the formula (2) is an odd number to 0 and shifting the image forming lens 91 at 0.32 mm in the main scanning direction, the dispersion of the cross sectional beam diameter of the laser beam forming the image on the photosensitive drum 23 is reduced, and various optical performances such as the fθ characteristic are improved. That is, only by shifting the optical parts having the power in the main scanning direction, it is possible to reduce the dispersion of the cross sectional beam diameter of the laser beam forming the image on the photosensitive drum 23. Further, the same effect can be obtained only by making only one surface of the image forming lens 91 eccentric which is not illustrated.

Further, in the light scanning unit shown in FIGS. 10A and 10B, when setting the coefficient in the case that the m in the formula (2) is an odd number to 0 and tilting the image forming lens 91 at 0.23 degrees around the axis in the sub scanning direction, it is confirmed that the dispersion of the beam diameter of the laser beam forming the image on the photosensitive drum 23 can be reduced and various optical performances such as the fθ characteristic can be improved. In the manner mentioned above, the dispersion of the cross sectional beam diameter of the laser beam forming the image on the photosensitive drum 23 can be also reduced by rotating the optical parts having the power around the axis in the sub scanning direction. Further, the same effect can be obtained only by rotating only one surface of the image forming lens 91. Further, it is possible to further reduce the dispersion of the cross sectional beam diameter of the laser beam forming the image on the photosensitive drum 23 by simultaneously applying the eccentricity and the rotation mentioned above to the image forming lens 91. Further, when the rotations around the axis in the main scanning direction and around the optical axis are combined in addition to the rotation around the axis in the sub scanning direction, the effect can be further increased.

In this case, in the respective light scanning unit shown in FIGS. 2A and 2B and FIGS. 10A and 10B, in the case of a multi-beam system in which a plurality of laser beams are incident to the image forming lens 61, it is desirable to define the lens surface of the image forming lens 91 by the following formula (3) in which an odd number term is included in a z order of an aspherical surface term in the formula (2).

$$X = \frac{CUY*y^2 + CUZ*z^2}{1 + \sqrt{1 - AY*CUY^2*y^2 - AZ*CUZ^2*z^2}} + \sum_{n=0}\sum_{m=0} A_{mn} y^m z^n \quad (3)$$

In the formula (3), y denotes a main scanning direction, z denotes a sub scanning direction and x denotes an optical axis direction.

As mentioned above, in the light scanning unit of the over illumination type, by employing the image forming lens in which the optical axis and the angle are shifted in the main scanning plane or the sub scanning cross sectional direction, at a time when the laser beam reflected by the individual reflective surfaces of the polygon mirror so as to be scanned forms the image on the photosensitive drum, it is possible to prevent the laser beam reflected by the first surface (or the second surface) of the image forming lens from being returned to the individual reflective surfaces of the polygon mirror. Accordingly, the reflected laser beam returned from the image forming lens is not scanned toward the photosensitive drum again by the individual reflective surfaces of the polygon mirror, and it is possible to remove the risk that the quality of the image is deteriorated.

However, when the laser beam is incident to the image forming lens in a state of giving the angle in the main scanning direction, the difference of the F number is increased between the scan starting position and the scan finishing position, so that the dispersion of the cross sectional beam diameter of the laser beam forming the image on the photosensitive drum is increased. Then, by making the shape of the incident surface or the emitting surface in the main scanning direction of the image forming lens or both of the surfaces asymmetrical along the main scanning direction, even in the case that the angle between the system among the incident laser beam incident to the individual reflective surfaces of the polygon mirror, the respective reflective surfaces of the polygon mirror and the photosensitive drum, and the optical axis is large, and the incident laser beam is incident to the individual reflective surfaces of the polygon mirror from the external portion of the image area, it is possible to restrict the dispersion of the cross sectional beam diameter of the laser beam forming the image on the photosensitive drum, and it is possible to make the cross sectional beam diameter uniform, so that the quality of the image can be improved.

As mentioned above, in accordance with the present invention, in the light scanning unit of the over illumination type, since the shape of the surface having the power in the image forming optical system is made asymmetrical in the main scanning direction, it is possible to prevent the image from being deteriorated by the reflected light by the lens surface of the image forming optical system, and it is possible to reduce the dispersion of the beam diameter in the image area, so that it is possible to improve the quality of the output image.

Further, in accordance with the present invention, there is provided an image forming apparatus comprising:
  a photo conductor receiving a light beam so as to form an image;
  a pre-deflection optical system aligning a light flux from a light source so as to form a long linear image in a first direction;
  a light scanning means scanning the light flux to a predetermined position of the photo conductor;
  a light scanning unit provided with an image forming optical system forming an image of the light flux scanned by the light scanning means on the photo conductor, the light flux incident to the light scanning means being wider than a width in the first direction of a single reflective surface of the light scanning means, the image forming optical system including an optical part having at least one surface which is asymmetrical in the first direction with respect to a center of the optical axis; and
  a developing unit developing an forming the image on the photo conductor by the light scanning unit.

Further, in accordance with the present invention, there is provided an image forming apparatus comprising:
  a photo conductor receiving a light beam so as to form an image;
  a pre-deflection optical system aligning a light flux from a light source so as to form a long linear image in a first direction;
  a light scanning means scanning the light flux to a predetermined position of the photo conductor;
  a light scanning unit provided with an image forming optical system forming an image of the light flux scanned by the light scanning means on the photo conductor, the light flux incident to the light scanning means being wider than a width in the first direction of a single reflective surface of the light scanning means;
  the image forming optical system having at least one surface in which its own center is rotated at a predetermined amount with respect to a center of rotation of a surface rotated around an axis in a second direction perpendicular to the first direction, at a position where a longitudinal center is made eccentric or crosses to the optical axis, in the first direction with respect to the optical axis; and
  a developing unit developing an forming the image on the photo conductor by the light scanning unit.

Further, in accordance with the present invention, there is provided an image forming apparatus comprising:
  a photo conductor receiving a light beam so as to form an image;
  a pre-deflection optical system aligning a light flux from a light source so as to form a long linear image in a first direction;
  a light scanning means scanning the light flux to a predetermined position of the photo conductor;
  a light scanning unit provided with an image forming optical system forming an image of the light flux scanned by the light scanning means on the photo conductor, the light flux incident to the light scanning means being wider than a width in the first direction of a single reflective surface of the light scanning means;

the image forming optical system including optical parts having at least one surface with a power, and an aspherical surface term of a shape of at least one the surface with the power among the optical parts including a term Am≠0 or Amn≠0 in the formula AmΣym (m=0, 1, 2, 3, . . . ) or AmnΣymzn (m=0, 1, 2, 3, . . . , n=0, 1, 2, 3, . . . ) when the formula m=2×k+1 (k=0, 1, 2, 3, . . . ) is established, in the case of setting the first direction of the at least one surface with the power to a y axis, a second direction perpendicular to the first direction to a z axis and a direction in which the light flux moves forward to an x axis; and a developing unit developing an forming the image on the photo conductor by the light scanning unit.

Further, in accordance with the present invention, there is provided an image forming apparatus comprising:

a photo conductor receiving a light beam so as to form an image;

a pre-deflection optical system aligning a light flux from a light source so as to form a long linear image in a first direction;

a light scanning means scanning the light flux to a predetermined position of the photo conductor;

a light scanning unit provided with an image forming optical system forming an image of the light flux scanned by the light scanning means on the photo conductor, the light flux incident to the light scanning means being wider than a width in the first direction of a single reflective surface of the light scanning means;

the image forming optical system including a lens having a power, the lens having the power having at least one surface accompanying with not surface treatment for restricting a reflection at a time when the light flux is incident, and an incident light to the light scanning means and an optical axis of the image forming optical system having an angle on the main scanning plane or the sub scanning plane; and a developing unit developing an forming the image on the photo conductor by the light scanning unit.

Further, in accordance with the present invention, there is provided an image forming apparatus comprising:

a photo conductor receiving a light beam so as to form an image;

a pre-deflection optical system aligning a light flux from a light source so as to form a long linear image in a first direction;

a light scanning means scanning the light flux to a predetermined position of the photo conductor;

a light scanning unit provided with an image forming optical system forming an image of the light flux scanned by the light scanning means on the photo conductor, the light flux incident to the light scanning means being wider than a width in the first direction of a single reflective surface of the light scanning means, the image forming optical system including a plurality of optical parts, and a number of the optical parts having a power being equal to or less than 2; and a developing unit developing an forming the image on the photo conductor by the light scanning unit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light scanning unit comprising:

a pre-deflection optical system aligning a light flux from a light source so as to form a long linear image in a first direction;

a light scanning means scanning said light flux to a predetermined position of a subject to be scanned; and an image forming optical system forming an image of the light flux scanned by said light scanning means on the subject to be scanned, said light flux incident to said light scanning means being wider than a width in said first direction of a single reflective surface of said light scanning means, wherein said image forming optical system includes an optical part having at least one surface which is asymmetrical in said first direction with respect to a center of the optical axis.

2. A light scanning unit according to claim 1, wherein said pre-deflection optical system includes lenses having different powers between said first direction and a second direction perpendicular to said first direction.

3. A light scanning unit according to claim 1, wherein when respectively projecting the incident light to said light scanning means and said optical axis of said image forming optical system on a scanning plane, an angle formed therebetween α is not equal to 0.

4. A light scanning unit according to claim 1, wherein an optical part having an asymmetrical surface in said first direction on a boundary point constituted by a passing position of said optical axis is a plastic lens.

5. A light scanning unit according to claim 1, wherein an optical part having an asymmetrical surface in said first direction on a boundary point constituted by a passing position of said optical axis is a plastic lens.

6. A light scanning unit according to claim 1, wherein an optical part having an asymmetrical surface in said first direction on a boundary point constituted by a passing position of said optical axis is a mirror.

7. A light scanning unit comprising:

a pre-deflection optical system aligning a light flux from a light source so as to form a long linear image in a first direction;

a light scanning means scanning said light flux to a predetermined position of a subject to be scanned; and an image forming optical system forming an image of the light flux scanned by said light scanning means on the subject to be scanned, said light flux incident to said light scanning means being wider than a width in said first direction of a single reflective surface of said light scanning means, wherein said image forming optical system has at least one surface in which its own center is rotated at a predetermined amount with respect to a center of rotation of a surface rotated around an axis in a second direction perpendicular to said first direction, at a position where a longitudinal center is made eccentric or crosses to said optical axis, in said first direction with respect to the optical axis.

8. A light scanning unit according to claim 7, wherein said image forming optical system has a plurality of optical parts with power.

9. A light scanning unit according to claim 7, wherein said pre-deflection optical system includes lenses having different powers between said first direction and a second direction perpendicular to said first direction.

10. A light scanning unit according to claim 7, wherein the surface in which its own center is rotated at a predetermined amount with respect to the center of rotation in the second direction perpendicular to said first direction, at the position where the longitudinal center is made eccentric or crosses to said optical axis, in said first direction with respect to said optical axis is a surface transmitting through said light flux.

11. A light scanning unit according to claim 7, wherein the surface in which its own center is rotated at a predetermined amount with respect to the center of rotation in the second direction perpendicular to said first direction, at the position where the longitudinal center is made eccentric or crosses to said optical axis, in said first direction with respect to said optical axis is a surface reflecting said light flux.

12. A light scanning unit comprising:
- a pre-deflection optical system aligning a light flux from a light source so as to form a long linear image in a first direction;
- a light scanning means scanning said light flux to a predetermined position of a subject to be scanned; and
- an image forming optical system forming an image of the light flux scanned by said light scanning means on the subject to be scanned, said light flux incident to said light scanning means being wider than a width in said first direction of a single reflective surface of said light scanning means,
- wherein said image forming optical system includes optical parts having at least one surface with a power, and an aspherical surface term of a shape of at least one the surface with the power among said optical parts includes a term $Am \neq 0$ or $Amn \neq 0$ in the formula $Am\Sigma ym$ (m=0, 1, 2, 3, ...) or $Amn\Sigma ymzn$ (m=0, 1, 2, 3, ..., n=0, 1, 2, 3, ...) when the formula $m=2 \times k+1$ (k=0, 1, 2, 3, ...) is established, in the case of setting said first direction of said at least one surface with the power to a y axis, a second direction perpendicular to said first direction to a z axis and a direction in which said light flux moves forward to an x axis.

13. A light scanning unit according to claim 12, wherein said pre-deflection optical system includes lenses having different powers between said first direction and a second direction perpendicular to said first direction.

14. A light scanning unit according to claim 12, wherein said optical part having at least one surface with the power is a mirror.

15. A light scanning unit comprising:
- a pre-deflection optical system aligning a light flux from a light source so as to form a long linear image in a first direction;
- a light scanning means scanning said light flux to a predetermined position of a subject to be scanned; and
- an image forming optical system forming an image of the light flux scanned by said light scanning means on the subject to be scanned, said light flux incident to said light scanning means being wider than a width in said first direction of a single reflective surface of said light scanning means,
- wherein said image forming optical system includes a lens having a power,
- said lens having the power has at least one surface accompanying with not surface treatment for restricting a reflection at a time when said light flux is incident, and an incident light to said light scanning means and an optical axis of said image forming optical system have an angle on the main scanning plane or the sub scanning plane.

16. A light scanning unit according to claim 15, wherein said pre-deflection optical system includes lenses having different powers between said first direction and a second direction perpendicular to said first direction.

17. A light scanning unit according to claim 15, wherein said image forming optical system includes an optical part having at least one surface which is asymmetrical in said first direction with respect to a center of the optical axis.

18. A light scanning unit according to claim 15, wherein said image forming optical system includes an optical part having at least one surface in which its own center is rotated at a predetermined amount with respect to a center of rotation of a surface rotated around an axis in a second direction perpendicular to said first direction, at a position where a longitudinal center is made eccentric or crosses to said optical axis, in said first direction with respect to a center of the optical axis.

19. A light scanning unit comprising:
- a pre-deflection optical system aligning a light flux from a light source so as to form a long linear image in a first direction;
- a light scanning means scanning said light flux to a predetermined position of a subject to be scanned; and
- an image forming optical system forming an image of the light flux scanned by said light scanning means on the subject to be scanned, said light flux incident to said light scanning means being wider than a width in said first direction of a single reflective surface of said light scanning means,
- wherein said image forming optical system includes a plurality of optical parts, and a number of the optical parts having a power is equal to or less than 2.

20. A light scanning unit according to claim 19, wherein said image forming optical system includes an optical part having at least one surface which is asymmetrical in said first direction with respect to a center of the optical axis.

* * * * *